United States Patent
Midorikawa et al.

(10) Patent No.: US 6,281,955 B1
(45) Date of Patent: Aug. 28, 2001

(54) LIQUID CRYSTAL DISPLAY DEVICE AND A METHOD OF MAKING THE SAME HAVING OVERLAPPING COLOR FILTERS WITH APERTURES

(75) Inventors: Teruyuki Midorikawa; Yasuharu Tanaka; Masumi Manabe; Minako Kurosaki; Muneharu Akiyoshi; Daisuke Miyazaki, all of Saitama-ken; Hitoshi Hatoh, Kanagawa-ken, all of (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/081,681

(22) Filed: May 20, 1998

(30) Foreign Application Priority Data

Jun. 12, 1997 (JP) .................................................. 9-154810

(51) Int. Cl.[7] .................................................. G02F 1/1335

(52) U.S. Cl. .................................................. 349/106

(58) Field of Search .................................................. 349/106

(56) References Cited

U.S. PATENT DOCUMENTS

| | | | |
|---|---|---|---|
| 5,499,128 | * 3/1996 | Hasegawa et al. | 349/155 |
| 5,568,293 | * 10/1996 | Takao et al. | 349/106 |
| 5,994,721 | * 11/1999 | Zhong et al. | 349/138 |

FOREIGN PATENT DOCUMENTS

2-54217   2/1990   (JP) .

\* cited by examiner

*Primary Examiner*—Walter J. Malinowski
(74) *Attorney, Agent, or Firm*—Oblon, Spivak, McClelland, Maier & Neustadt, P.C.

(57) ABSTRACT

A color filter is disposed on a switching element array substrate. The color filter is composed of a plurality of kinds of color elements and an aperture. Two of the filter elements are overlapped at one end portion thereof. Each of the filter elements is covered with a pixel electrode. The pixel electrode is connected to the switching element through the aperture. This structure reduces electric coupling between the pixel electrode and the gate and signal lines. Optimum conditions among the overlapped width, and the aperture diameter and location are set to prevent the filter element from peeling off the array substrate so that the production yield can be significantly improved.

16 Claims, 5 Drawing Sheets

LIQUID CRYSTAL DISPLAY DEVICE AND A METHOD OF MAKING THE SAME HAVING OVERLAPPING COLOR FILTERS WITH APERTURES

BACKGROUND OF THE INVENTION

FIELD OF THE INVENTION

This invention relates to a liquid crystal display device and a method of making the same and, more particularly, to a liquid crystal display device with excellent quality pictures in which color filters are provided on a switching element array substrate and a method of making the same with high productivity.

FIG. 5 is a cross sectional view of a conventional active-matrix type liquid crystal display device. The liquid crystal display device 100 consists primarily of an array substrate 110 on which switching elements, such as thin film transistors (TFTs) are disposed in a matrix form, a counter substrate 150 provided opposite to the array substrate 110 and a liquid crystal layer 170 held between the substrates 110 and 150.

Gate electrodes 116 of the TFTs are disposed on a glass plate substrate 111 and a gate isolation layer 112 is coated on the gate electrodes 116. The TFT 114 includes the gate electrode 116, an insulation layer 112, a semiconductor layer 115 made of amorphous silicon, for instance, and source and drain electrodes 120 and 118. The drain electrode 118 is connected to a signal line. The source electrode 120 is also connected to a transparent pixel electrode 130 covering an organic isolation film 124 and extending along an aperture 126 defined in the isolation film 124.

The counter substrate 150 includes a transparent substrate 152, a color filter layer consisting of a light blocking layer 154 and filter elements 156 disposed on the substrate 152, and a transparent common electrode 158 covering the color filter layer. The common electrode 158 may be made of Indium Tin Oxide (ITO), for instance. Further, an alignment layer (not shown in FIG. 5) is coated on the inner surface of the common electrode 158.

The liquid crystal display device shown in FIG. 5 is apt to be faced with such technical problems that electrical coupling between the pixel electrode 130 and the signal and gate lines 118 and 116 increases coupling capacitance and brings about crosstalk between pixels. In addition, since an exact position alignment must be made between each filter element 156 of the counter substrate 150 and every pixel aperture of the array substrate 110, assembling processes therefor are complicated.

In order to solve them, the structure may be modified to form the color filters on the array substrate. The organic isolation layer 124, for instance, is also used for the color filters.

In the case of the modified structure, however, the isolation layer 124 necessarily contains three-color (red, green and blue) filter elements. Thus, stripe-like patterning, for instance, is applied to make the color filters so that each pixel electrode may correspond to a filter element. The color filters are formed by processing one filter element to another in the following way, i.e., coating a filter layer material on the array substrate, and exposing and patterning it.

Where apertures are further made to connect the switching elements to the pixel electrodes at the same time of such patterning process for each filter element, the second and third filter layers are quite easy to peel off the array substrate at the end thereof.

SUMMARY OF THE INVENTION

An object of the present invention is to provide a liquid crystal display device which structure can effectively prevent filter elements from peeling of f a switching element array substrate, display excellent quality images, and have a high production yield, and a method of making the same.

A liquid crystal display device of the present invention includes an array substrate made of a substrate and switching elements disposed on the substrate in a matrix form, a transparent counter substrate provided opposite to the array substrate with a transparent counter electrode, and a liquid crystal layer held between the array and counter substrates. The array substrate is composed of a plurality of filter elements disposed on the substrate with a predetermined pattern. The filter elements form color filter layers, at the edges of which two adjacent layers are overlapped with each other. Each filter element is covered with a pixel electrode and is provided with an aperture to connect the pixel electrode to the switching element. The overlapping portions are designed to prevent the filter element from peeling off during the manufacturing processes of the liquid crystal display device.

The color filter layer consists of at least three kinds of filter elements which have different spectral characteristics from each other. The filter elements with the same spectral characteristics are concurrently formed through the same process. The overlapping portions are designed to be wider in width as the filter elements are formed later in order to prevent the later formed elements from peeling off.

The peeling-off of the filter elements is effectively avoided if the diameter TH ($\mu$m) of the aperture and the width ($\mu$m) of the overlapping portions are satisfied with the following:

TH<5 $\mu$m, OL$\geq$1.5 $\mu$m

5 $\mu$m$\leq$TH$\leq$10 $\mu$m, OL$\geq$1.0 $\mu$m, and

10 $\mu$m<TH, OL$\geq$0.5 $\mu$m.

The overlapping portions are also effectively kept from peeling off if the thickness T($\mu$m) of the filter element and the minimum distance L($\mu$m) between the end of the filter element and the aperture are satisfied with the following:

L$\geq$2$\times$(T/1.5)$^2$ $^+$2

Further, where the filter elements are made of photosensitive materials, the forming processes are simplified.

Since the liquid crystal display device of the present invention is provided with the color filters formed on the array substrate and the overlapping portions at the boundary of the color filters, the electrical coupling with the pixel electrode is substantially reduced, the display device shows high quality color images, assembling troubles seldom occur, and high production yields can be obtained.

The inventors of this application have carried out experiments and eventually discovered conditions with respect to the overlapping layer width and other related configurations to gain remarkable effects.

The above-stated and other objects and technical features of the present invention will become apparent from the following description when taken with the accompanying drawings. It will be understood, however, that the drawings are for purposes of illustration and are not to be construed as defining the scope of the invention, reference being had for the latter purpose to the claims appended hereto.

DETAIL DESCRIPTION OF PREFERRED EMBODIMENT

Figure 1:
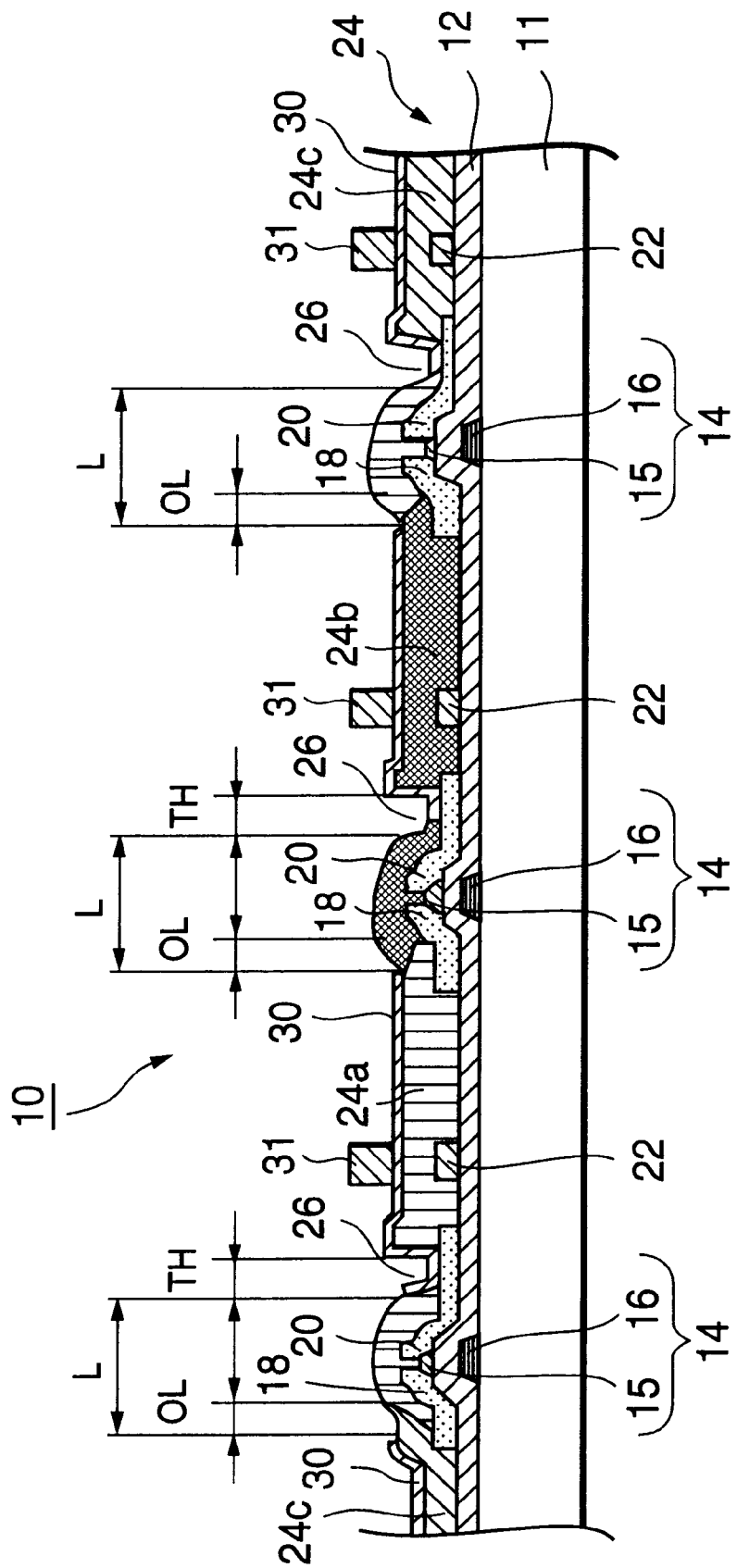
FIG. 1 is a schematic sectional view of a switching element array substrate in a liquid crystal display device of the present invention.

Embodiments of the present invention will be explained hereinafter with reference to the attached drawings. FIG. 1 is a schematic sectional view of a switching element array substrate in a liquid crystal display device of this invention. Thin film transistors (TFTS) 14 are formed on the array substrate 10 as the switching elements. The TFT 14 includes a semiconductor layer 15, a gate electrode 16, a drain electrode 18 connected a signal line and a source electrode 20.

In the embodiment of the present invention, color filters 24 are disposed on the TFTs 14. The color filters 24 each have a predetermined pattern and stripe filter elements consisting of red (R) filter elements 24a, green (G) filter elements and blue (B) filter elements, for example. Each filter element may be piled on every pixel.

Each of the filter elements 24a, 24b and 24c has an overlapping portion OL with the other at its one end. The pixel electrodes 30 are piled on the filter elements 24a, 24b and 24c and connected to the source electrodes 20 through apertures 26 defined in the filter elements 24a, 24b and 24c. Since the thick color filter layer 24 is disposed between the TFT 14 and the pixel electrode 30, the electrical coupling with the pixel electrode 30 is reduced. As evident from the explanation to be made in detail latter on, assembling troubles, such as peeling off of the filter elements, can be avoided at the production, and the yield is remarkably improved because the filter elements 24a, 24b and 24c each have the overlapping portions OL.

The production processes of the array substrate 10 will be explained hereinafter with reference to FIG. 1. An approximately 0.3 µm thick molybdenum layer is coated on a transparent substrate 11 by using a sputtering method. The molybdenum layer is made into gate lines 16 through a patterning process. An approximately 0.15 µm thick silicon oxide or silicon nitride film is formed as a gate insulation layer 12 by making use of a chemical vapor deposition (CVD) method. An amorphous silicon (a-Si) layer is formed thereon by applying a plasma enhanced chemical vapor deposition (PECVD) method and made into a semiconductor layer 15 by means of a patterning process. Electrode materials are disposed thereon and are also made into the drain electrodes 18 (connected to the signal lines),the source electrodes 20 and storage capacitor line 22 by a patterning process.

Next, the color filter layer 24 is formed. The layer 24 is made of red, green, and blue filter elements, for instance.

An organic system of an approximately 20 wt % red pigment is dispersed into a photohardening acrylic type photoresist solution which is capable of alkaline development of the color filter elements. The material thus obtained is coated on the array substrate by a spin coating method. The spin-coated material is then baked at about 90° C. for about 5 minutes and is exposed through a predetermined photomask pattern. By way of example, such a patterning process provides color filter elements, each of which has a stripe shape extending along the vertical axis of the display screen, a 15 µm diameter (TH) circular aperture 26 at the connecting portion of the pixel electrode 30 with the source electrode 20, and a 12 µm minimum length (L) from the color filter element 24a to the edge of the aperture 26. The exposure may be performed by using an ultraviolet-ray with the intensity of 150 mJ/cm$^2$, for instance.

Development of the filter element 24a is then carried out. A water solution of about 0.1 wt % tetramethylammonium hydride (TMAH) is used as a developing fluid. The developing time is approximately 60 seconds in this case. After a water wash of the filter elements, post-baking at about 200° C. is carried out for approximately one hour, and the filter element 24a with the aperture 26 is formed.

The green color filter 24b and the blue color filter 24c are sequentially made in the similar way.

The pixel electrodes 30, spacers 31 and an edge frame (not shown) are then disposed on the array substrate 10. The pixel electrodes 30 are made of indium tin oxide (ITO), for instance, by using a sputtering method. The spacers 31 and the edge frame are made of a black photoresist material. The material is coated on the array substrate by using a spin-coating method. The coated material is then pre-baked at 90° C. for 5 minutes, is exposed to an ultraviolet-ray with the intensity of 250 mJ/cm$^2$, and is subject to a patterning process. The edge frame is formed around the edge portions of the display device and is about 5 mm in width and 5 µm in height. The optical density of the edge frame is approximately 3.5. The spacers 31 are disposed on the storage capacitor lines, and are columns in shape which are about 12 µm in lateral sectional diameter and 5 µm in height. Further an alignment layer (not shown) is coated on the pixel electrodes 30 and spacers 31. Thus, the array substrate 10 is completed.

Figure 2:
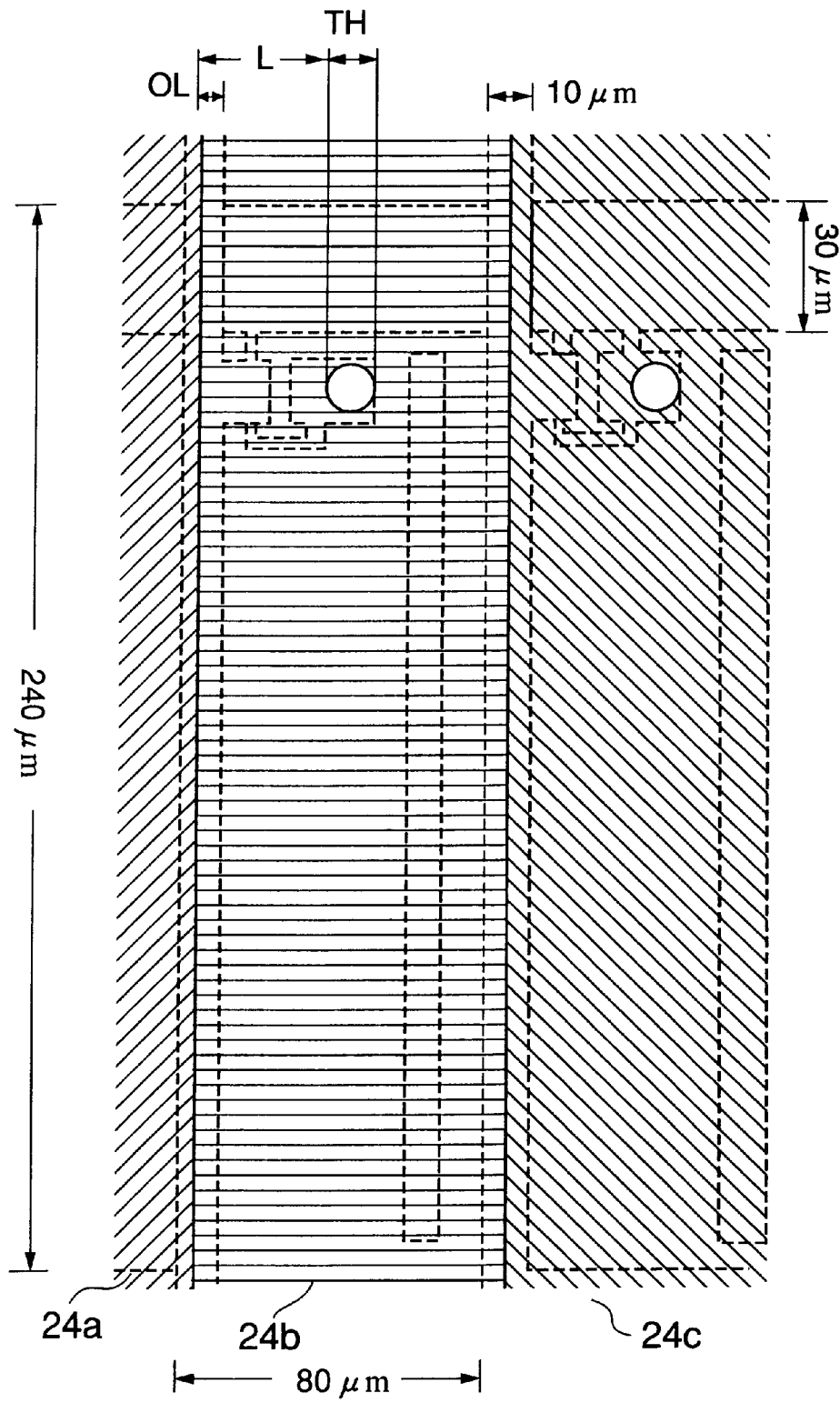
FIG. 2 is a schematic plan view of the layout of the array substrate shown in FIG. 1.

FIG. 2 is a plan view of a schematic layout of the array substrate 10 on which the pixel electrodes 30 are not coated for the sake of illustration. The color filter elements 24a through 24c are entire stripes in shape provided along the vertical axis of the display screen in this embodiment. They may be, however, in the form of mosaic or dots. Where the technical specifications of the liquid crystal display device are the extended video graphic display (XVGA) for 12.1-inch diagonal length screen, one pixel electrode is 80 µm in width and 240 µm in length, for instance, as shown in FIG. 2. The scanning and signal lines are about 30 µm and about 10 µm in width, respectively. It is noted that the values set forth above do not always correspond to the sizes of the components shown in FIGS. 1 and 2.

With respect to the counter substrate, a counter electrode made of an approximately 100 nm thick ITO film is formed on a glass plate by a sputtering method. An alignment layer made of polyimide is coated on the counter electrode, and alignment processing is applied to it (e.g., rubbing the polyimide surface with cloth).

Tiny resin ball spacers with an about 5 µm diameter may be used instead of the column spacers 31. The ball spacers are scattered on the array substrate 11 to keep the gap between the substrates substantially constant. The scattered density of about 5 µm diameter ball spacers is at a rate of about 100/mm$^2$ on the array substrate 10.

A seal material including predetermined diameter fiber mixtures are coated at the surrounding portions of the counter substrate. The seal material may be a product of XN-21-FA manufactured by Mitsui Toatsu Kagaku Co., Ltd. In coating the seal material, a liquid crystal injection inlet is provided in the surrounding portion. The counter substrate is glued to the array substrate 10 by the seal material to make empty cells.

A nematic liquid crystal material with a chiral additive is injected into the cells through the inlet under a vacuum. After the inlet is sealed by using an ultraviolet-ray-hardening resin, retardation films and then polarizers are put on the outer side of the counter substrate so that the liquid crystal display device is completed.

The applicants of this application have discovered at the initial stage of their prototype-making experiment that the filter element made later in turn is easier to peel off than the one made earlier in the manufacturing process sequences of the filter elements 24a, 24b and 24c on the substrate. Where the green filter 24b is made after the red filter 24a has been made, the green filter 24b is much easier to peel off the substrate. In the event the blue filter 24c is then made, it tends to be much easier to peel off than the green filter 24b.

The applicants have also discovered as a result of further study in detail that such "peeling off" takes place in the developing process of the filter element adjacent to the previously made filter element. They have further found out that the "peeling off" is caused in the developing process by the developing fluid which infiltrates the underneath of the filter element through an edge of the filter element during the patterning process or the aperture.

The applicants have empirically obtained practical solutions as to overlapping the filter elements with each other and necessary "overlapping width" data therefor to prevent the filter elements from peeling off the TFT portion. It is presumed that the adhesion between same materials is stronger than that between different materials. The overlapping structure of the filter elements shown in FIG. 1 is based on those solutions.

Here, as a general rule, the "peeling off" reduces as the overlapping width becomes wider. Colors, however, are mixed at the overlapping portions. Thus, as the overlapping region is larger, it causes poorer display quality of the liquid crystal display device. The applicants have conducted systematic experiments on the relationship between the overlapping width and the production yield due to the "peeling off". As a result, it is understood that the yield varies in accordance with the "overlapping width" of the filter elements, the location of the aperture 26 and the thickness of the filter elements 24.

Firstly, relations between the overlapping width of the filter elements and the diameter of the aperture will be explained hereinafter.

Figure 3:
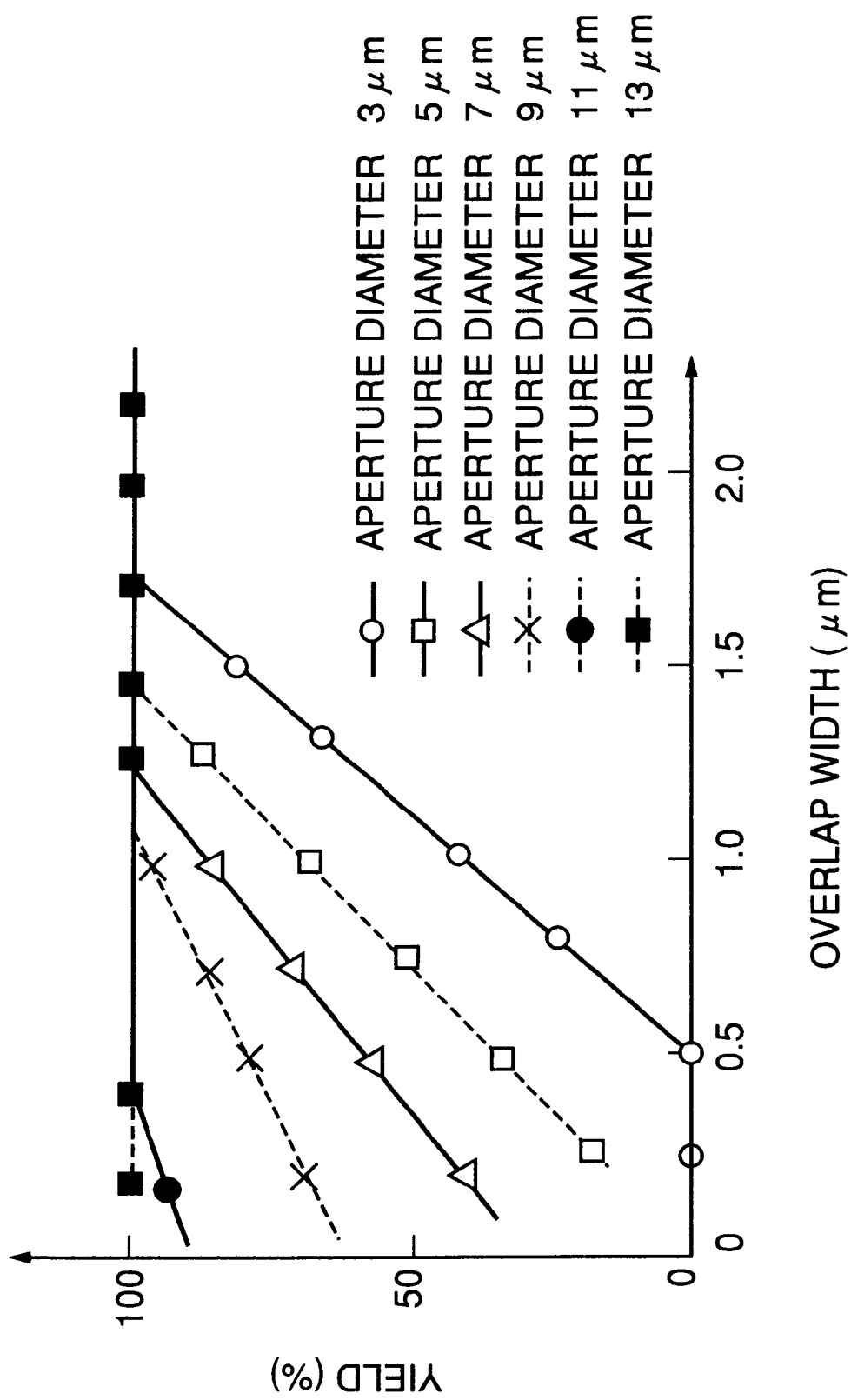
FIG. 3 shows production yields due to "Pealing off" of filter elements in which the x-axis represents an overlapping width OL of the filter elements and the y-axis indicates the yields resulting from the "Pealing off"

FIG. 3 shows graphs of data obtained from the applicants' experiments, which indicate the production yield due to the "peeling off". In FIG. 3, the x- and y-axes represent the overlapping width OL ($\mu$m) of the filter elements and the yield (%) resulting from the "peeling off", respectively. The data are shown in the case of the filter elements with the thickness of 4 $\mu$m by way of example.

The "overlapping width OL" is a distance defined between the edge of the lower filter element and that of the upper filter element as shown in FIG. 1. In the experiments, the width OL has been measured by a microscopic observation. The "yield" has been also evaluated on a basis of the external appearance inspection by the microscopic observation. Where the developing fluid infiltrates the underneath of the filter element, a certain contrast difference is obtained by the microscopic observation. Such a contrast difference is judged to be "bad" in the event that the yield is calculated.

The relationship between the overlapping width OL and the yield at every diameter TH of the aperture is plotted in FIG. 3. The diameter TH of the aperture is defined as that of the aperture bottom as shown in FIG. 1 and is measured by the microscopic observation.

As evident from FIG. 3, the yield raises as the overlapping width OL becomes wider in the case of any diameter of the aperture. Where the overlapping width OL is wider than a certain value, the yield becomes 100%. It is deemed that the developing fluid is more difficult to infiltrate the underneath of the filter element during the patterning process as the overlapping width OL becomes wider.

As the diameter TH of the aperture becomes smaller, the yield tends to be lower. Where the diameter TH is smaller, longer time is taken for soaking the filter element in the developing fluid. As a result, the developing fluid easily infiltrates the underneath of the filter element. A reason for the longer soaking time may be that the smaller diameter aperture is not easily supplied with a fresh developing fluid and hinders the progress of the development.

The applicants have conducted experiment not only on the circular apertures but also polygonal apertures. Plotted data of the polygonal apertures turn out to be substantially the same as in FIG. 3 in the case that the polygonal and circular apertures have the same in area.

The overlapping widths OL for good yields are summarized with respect to the aperture diameter TH as follows:

TH<5 $\mu$m, OL$\geq$1.5 $\mu$m

5 $\mu$m$\leq$TH$\leq$10 $\mu$m, OL$\geq$10 $\mu$m, and

10 $\mu$m<TH, OL$\geq$0.5 $\mu$m

In short, where the overlapping width OL is set at a given diameter to satisfy the above conditions, the liquid crystal display device is manufactured with the good yield.

Figure 4:
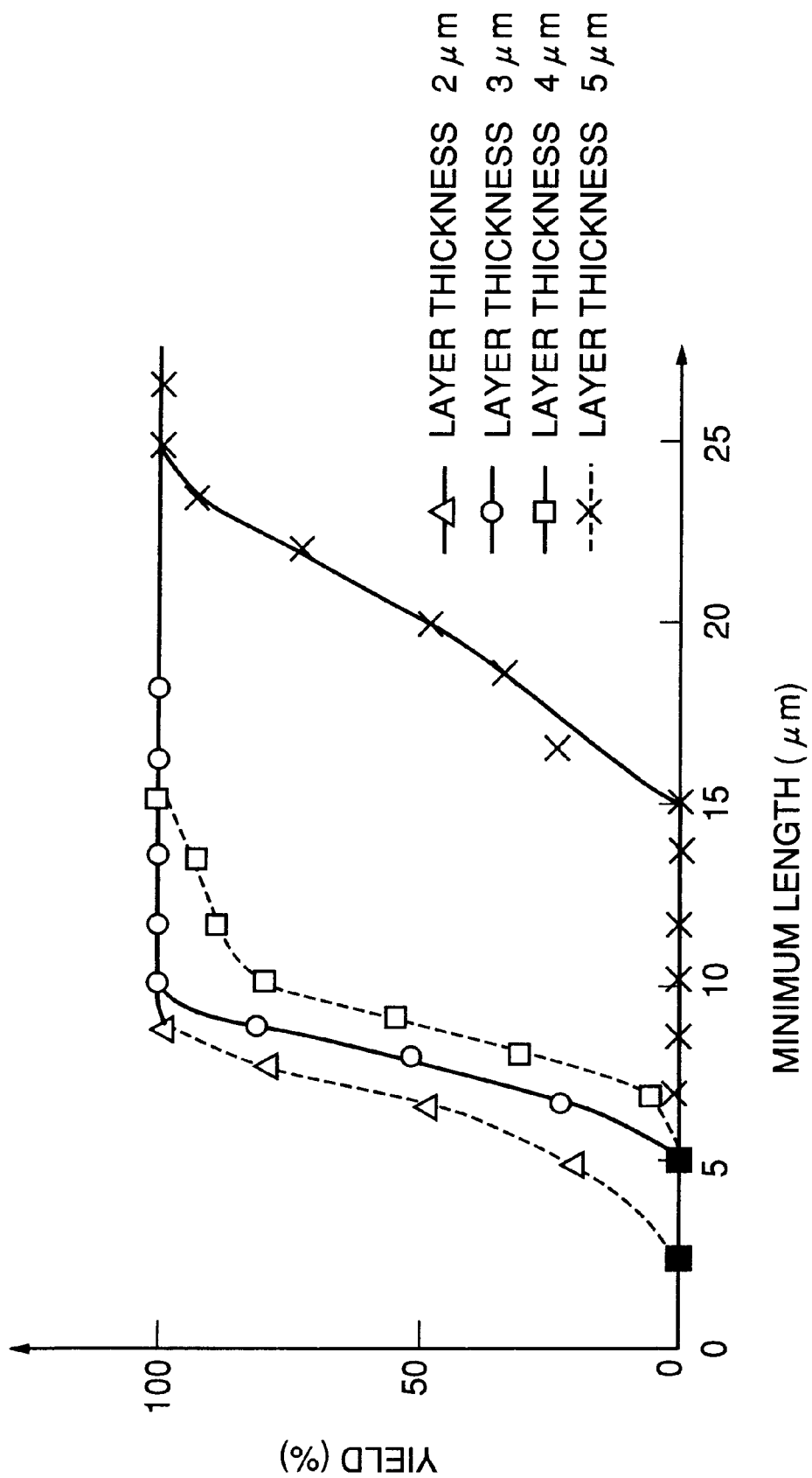
FIG. 4 shows graphs plotting the relationship between a location of an aperture and the production yield every thickness of the filter element.
Figure 5:
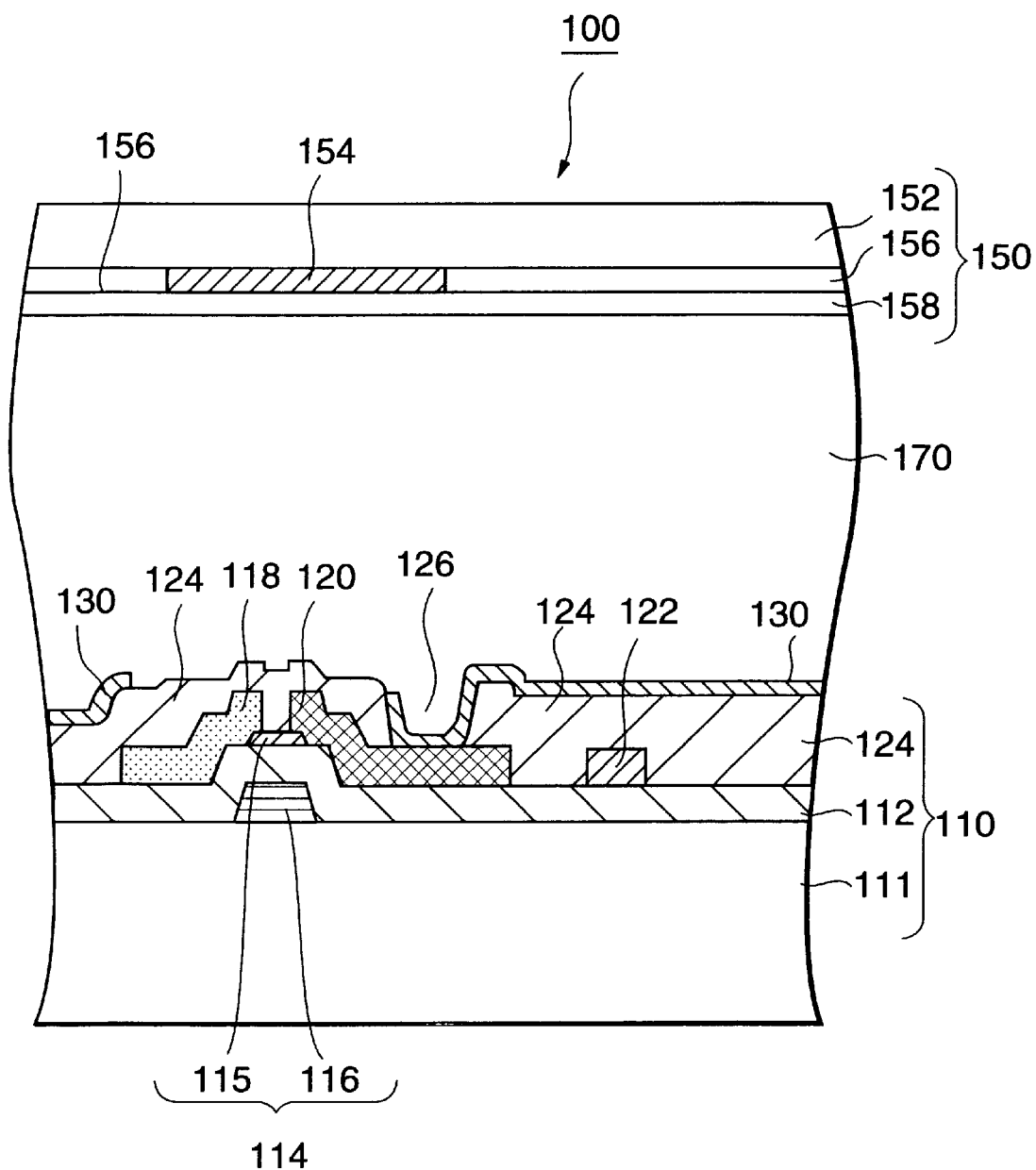
FIG. 5 is a schematic sectional view of a conventional active-matrix type liquid crystal display device.

Next, the relationship between the location of the aperture 26 and the thickness of the filter element will be explained hereinafter. FIG. 4 shows graphs plotting the relations between the aperture location and the yield at every filter element thickness. Here, the aperture location "L" is defined as the minimum length from the filter element edge to the aperture edge as illustrated in FIG. 1. Data shown in FIG. 4 exemplify cases in which the overlapping width OL and the aperture diameter TH are 0.7 $\mu$m and 15 $\mu$m, respectively.

As seen from the data, the yield reduces as the minimum length L is shorter. That is, the yield becomes poorer as the aperture is closer to the filter element edge. According to the applicants' observation, the yield reduction is caused in most cases by the "peeling off" at the minimum distance portion between the filter element edge and the aperture. Where the filter element edge is close to the aperture, the minimum distance portion is easily subject to stress and the developing fluid easily infiltrates into the filter element from both edges of the aperture and the filter element.

Further, the yield in FIG. 4 tends to decrease as the filter element thickness becomes thicker. It may be because the development requires longer time in accordance with the thickness increase of the filter element and the developing fluid easily infiltrates into the filter element during its ongoing process from its edge.

In order to obtain an acceptable yield, the aperture location L ($\mu$m) derived from FIG. 4 is:

L$\geq$2$\times$(T/1.5)$^{2}$ $^{+}$2 where T($\mu$m) is the filter element thickness. The filter elements hardly peel off and the liquid crystal display device can be manufactured with the acceptable yield in the case that the aperture location L is within the range of the conditions set forth above. As shown in FIG. 1, the filter element edge is often provided on the TFT 14. Thus, the longer distance L separates the filter element edge from the TFT 14 more effectively, and the electric coupling between the pixel electrode 30 and the signal line can be reduced.

The data shown in FIGS. 3 and 4 result from the patterning processes by which the first and second color filter elements are made sequentially side by side. The applicants' experiments have revealed a tendency that patterning of a third color filter element adjacent to the second filter element requires longer time than that of the second one. Although its cause is not clear in detail, it presumes the process sequence to repeat lamination patterning. Thus, it is desirable to set the overlapping width between the second and third color filter elements wider than that between the first and second color filter elements. In addition, it is also desirable to set the location of the aperture 26 for the second color filter element on a closer side of the first color filter element.

The structure of the array substrate shown in FIG. 1 has been set as follows: the diameter TH of the aperture 26 is 15 $\mu$m; the overlapping width OL between the first red color filter 24a and the second green color filter 24b is 0.7 $\mu$m, that between the second green filter 24b and the third blue color filter 24c is 1.2 $\mu$m; and the thickness of each filter element is 4 $\mu$m. The "peeling off" has not taken place in the laminating process of the filter elements so that the liquid crystal display device has been manufactured with a high yield.

According to the present invention, the peeling off can be avoided even though the aperture diameter is 15 $\mu$m or so. Thus, the aperture area of a pixel is enlarged so that liquid crystal display devices with large aperture ratio pixels and high brightness displays can be manufactured at a high yield.

The switching elements disposed on the array substrate are the TFTs, for instance, in the embodiments mentioned above but they are not limited thereto. The other elements, such as thin film diodes (TFDs), may be used as the switching elements.

Semiconductors used for the switching elements are made of either amorphous silicon or polycrystalline silicon. Where the semiconductor is made of the polycrystalline silicon, driving circuits can be integrated on the array substrate.

The present invention can be applied not only to a transparent type liquid crystal display device but also to a reflection type liquid crystal display device. Namely, color display may be provided in the latter because external ambient light can be used as light source in the case that an optical reflection plate is disposed between the switching element and the color filter.

The photosensitive photoresist is exemplified in the embodiments but non-photosensitive materials may be used in the patterning process.

The filter elements are not limited to the pigment dispersion materials set forth above but may be dye materials with predetermined spectrum characteristics.

The filter characteristic of the color layer is not only light absorption types but also light non-absorption types with predetermined spectrum characteristics, such as an interference type and a selective reflection type of cholesteric liquid crystal materials.

Further, as long as a predetermined electric contact is achieved, the aperture may be not only circular but also square, rectangular, or elliptical in shape.

The present invention can be carried out for the embodiments explained above, and provides the following advantages.

Since the color filters disposed between the TFTs and the pixel electrodes are relatively thick, the electric coupling with the pixel electrodes are substantially reduced. The overlapping portions thereof prevent the filter elements from peeling off during the manufacturing processes so that the production yield can be remarkably improved and highly reliable liquid crystal display devices can be produced.

The present invention clearly provides an optimum range of the overlapping width with respect to the thickness of the color filter, the aperture location, and the aperture diameter. Thus, liquid crystal display devices with high display quality can be manufactured with a high yield.

The present invention prevents the filter elements from peeling off even though the small aperture diameter is in the order of 10 $\mu$m. The aperture with such a small diameter results in enlargement of the pixel aperture. As a result, liquid crystal display devices with high aperture ratio pixels can be manufactured with a high production yield.

The present invention can provide liquid crystal display systems with low power consumption, and bright, high contrast ratio and bring about significant industrial advantages.

What we claim is:

1. A liquid crystal display device, comprising:
   an array substrate including switching elements disposed in a matrix form;
   a counter substrate provided opposite to said array substrate;
   a liquid crystal layer held between said array and counter substrates;
   a color filter layer including a plurality of filter elements disposed on said array substrate and including apertures and overlapping portions where one of said filter elements is overlapped with another one of said filter elements at an edge portion of the one of said filter elements disposed on said switching elements; and
   pixel electrodes provided on said color filter layer and electrically connected to said switching elements through said apertures,
   wherein a diameter TH of each of said apertures and a cross-sectionally lateral width OL of each of said overlapping portions are satisfied with the following range:
   if TH<5 $\mu$m, then OL$\geq$1.5 $\mu$m;
   if 5 $\mu$m$\leq$TH$\leq$10 $\mu$m, then OL$\geq$1.0 $\mu$m; and
   if 10 $\mu$m<TH then OL$\geq$0.5 $\mu$m.

2. The liquid crystal display device according to claim 1, wherein said plurality of filter elements include first, second, and third filter elements which are formed in order thereof, said overlapping portions include a first overlapping portion in which said first and second filter elements overlap with each other and a second overlapping portion in which said second and third filter elements overlap with each other, and said first overlapping portion is shorter in a cross-sectionally lateral width than said second overlapping portion.

3. The liquid crystal display device according to claim 2, wherein a thickness T ($\mu$m) of each of said filter elements and a length L ($\mu$m) defined between edges of each of said filter elements and each of said apertures are satisfied with the following range:
   L$\geq$2$\times$(T/1.5)$^2$+2.

4. The liquid crystal display device according to claim 2, wherein said filter elements are made of a photosensitive material.

5. The liquid crystal display device according to claim 1, wherein a thickness T ($\mu$m) of each of said filter elements and a length L ($\mu$m) defined between edges of each of said filter elements and each of said apertures are satisfied with the following range:

$L \geq 2 \times (T/1.5)^2 + 2$.

6. The liquid crystal display device according to claim 1, wherein said filter elements are made of a photosensitive material.

7. A method of manufacturing a liquid crystal display device, comprising the steps of:

forming an array substrate having:
- a plurality of signal and scanning lines crossing each other,
- switching elements disposed in a matrix form adjacent to said crossing points of said signal and scanning lines,
- pixel electrodes connected to said switching elements,
- first and second filter elements correspondingly disposed under said pixel electrodes, and
- apertures provided in said filter elements for connecting said pixel electrodes to said switching elements;

providing a counter substrate opposite to said array substrate; and providing a liquid crystal layer held between said array and counter substrates, wherein said first filter element is formed by a first patterning process, wherein said second filter element with a first overlapping portion to overlap with said first filter element is formed by a second patterning process, and wherein a diameter TH of each of said apertures and a cross-sectionally lateral width OL of said first overlapping portion are satisfied with the following range:

if $TH < 5$ μm, then $OL \geq 1.5$ μm;
if $5$ μm $\leq TH \leq 10$ μm, then $OL \geq 1.0$ μm; and
if $10$ μm $\leq TH$, then $OL \geq 0.5$ μm.

8. A method of making a liquid crystal display device according to claim 7, wherein said liquid crystal display device further includes a third filter element disposed between said first and second filter elements, and said method further includes a step of forming said third filter element with a second overlapping portion to overlap with said first element or said second filter element by a third patterning process so that a cross-sectional lateral width of said second overlapping portion is wider than that of second overlapping portion.

9. The method of making a liquid crystal display device according to claim 8, wherein a thickness T (μm) of each of said filter elements and a length L (μm) defined between edges of each of said filter elements and each of said apertures are satisfied with the following range:

$L \geq 2 \times (T/1.5)^2 + 2$.

10. The method of making a liquid crystal display device according to claim 8, wherein said first and second filter elements comprise a photosensitive material.

11. The liquid crystal display device according to claim 2, further comprising resin spacers disposed between said array and counter substrates.

12. The liquid crystal display device according to claim 11, wherein said spacers comprise of a light blocking resin material.

13. The method of making a liquid crystal display device according to claim 7, wherein a thickness T (μm) of each of said filter elements and a length L (μm) defined between edges of each of said filter elements and each of said apertures are satisfied with the following range:

$L \geq 2 \times (T/1.5)^2 + 2$.

14. The method of making a liquid crystal display device according to claim 7, wherein said first and second filter elements comprise a photosensitive material.

15. The liquid crystal display device according to claim 1, further comprising resin spacers disposed between said array and counter substrates.

16. The liquid crystal display device according to claim 15, wherein said spacers comprise of a light blocking resin material.

* * * * *

UNITED STATES PATENT AND TRADEMARK OFFICE
CERTIFICATE OF CORRECTION

PATENT NO.    : 6,281,955 B1
DATED         : August 28, 2001
INVENTOR(S)   : Midorikawa et al.

It is certified that error appears in the above-identified patent and that said Letters Patent is hereby corrected as shown below:

<u>Title page,</u>
Item [45], and the Notice information should read:

-- [45] Date of Patent: *Aug. 28, 2001 --

-- [*] Notice:  This patent issued on a continued prosecution application filed under 37 CFR 1.53(d), and is subject to the twenty years patent term provisions of 35 U.S.C. 154(a)(2).

Subject to any disclaimer, the term of this patent is extended or adjusted under 35 U.S.C. 154(b) by 0 days. --

Signed and Sealed this

Twentieth Day of August, 2002

Attest:

JAMES E. ROGAN
*Attesting Officer*   *Director of the United States Patent and Trademark Office*